United States Patent
Vemuri et al.

(10) Patent No.: US 7,912,454 B2
(45) Date of Patent: Mar. 22, 2011

(54) METHOD AND SYSTEM FOR ARCHIVING DATA IN REAL-TIME COMMUNICATIONS

(75) Inventors: Sunil Vemuri, Boston, MA (US); Nagabhushan Rao Machiraju, Ventura, CA (US)

(73) Assignee: Reqall, Inc., Moffett Field, CA (US)

( * ) Notice: Subject to any disclaimer, the term of this patent is extended or adjusted under 35 U.S.C. 154(b) by 1254 days.

(21) Appl. No.: 11/464,773

(22) Filed: Aug. 15, 2006

(65) Prior Publication Data

US 2008/0043990 A1      Feb. 21, 2008

(51) Int. Cl.
*H04M 1/725*      (2006.01)
(52) U.S. Cl. .......... 455/412.1; 455/514; 725/89; 725/90
(58) Field of Classification Search ............... 455/412.1, 455/414.4, 514, 517, 520; 348/14.12, 14.13, 348/387.1, 388.1, 390.1; 375/240.01, 240.25; 725/81, 87, 89, 90, 91, 92, 93, 94, 95, 96, 725/115, 145, 148
See application file for complete search history.

(56) References Cited

U.S. PATENT DOCUMENTS

2001/0033303 A1*  10/2001  Anderson ..................... 345/854
2007/0101378 A1*   5/2007  Jacobs ........................... 725/90

* cited by examiner

*Primary Examiner* — Lana N Le
*Assistant Examiner* — Ping Y Hsieh
(74) *Attorney, Agent, or Firm* — SNR Denton US LLP (57) ABSTRACT

Consistent with an embodiment of the invention, a communication device enables real-time communications by generating a representation of an analog input signal that is suitable for communication over a real-time communication channel to a remote communication device. In addition, the communication device stores and processes an alternative representation of the input, which is communicated to the remote device in a reliable, out-of band channel. Accordingly, the remote communication device initially stores the real-time data, but later automatically replaces the real-time data with the enhanced data that it receives over the reliable, out-of-band communication channel. The communication device similarly stores, and replaces, data received from the remote communication device.

21 Claims, 6 Drawing Sheets

METHOD AND SYSTEM FOR ARCHIVING DATA IN REAL-TIME COMMUNICATIONS

FIELD OF THE INVENTION

The present invention relates generally to real-time communications. More particularly, the invention relates to methods and systems for processing data so as to improve signal processing and archiving of data used in real-time communication systems.

BACKGROUND

Despite significant improvements, the data rates of modern networks are generally not capable of supporting lossless, real-time communication of high-quality data signals, such as high-resolution video signals and uncompressed audio signals. Consequently, in many real-time communication systems, signal quality and signal reliability are often sacrificed to meet the timing constraints imposed by real-time systems.

Figure 1:
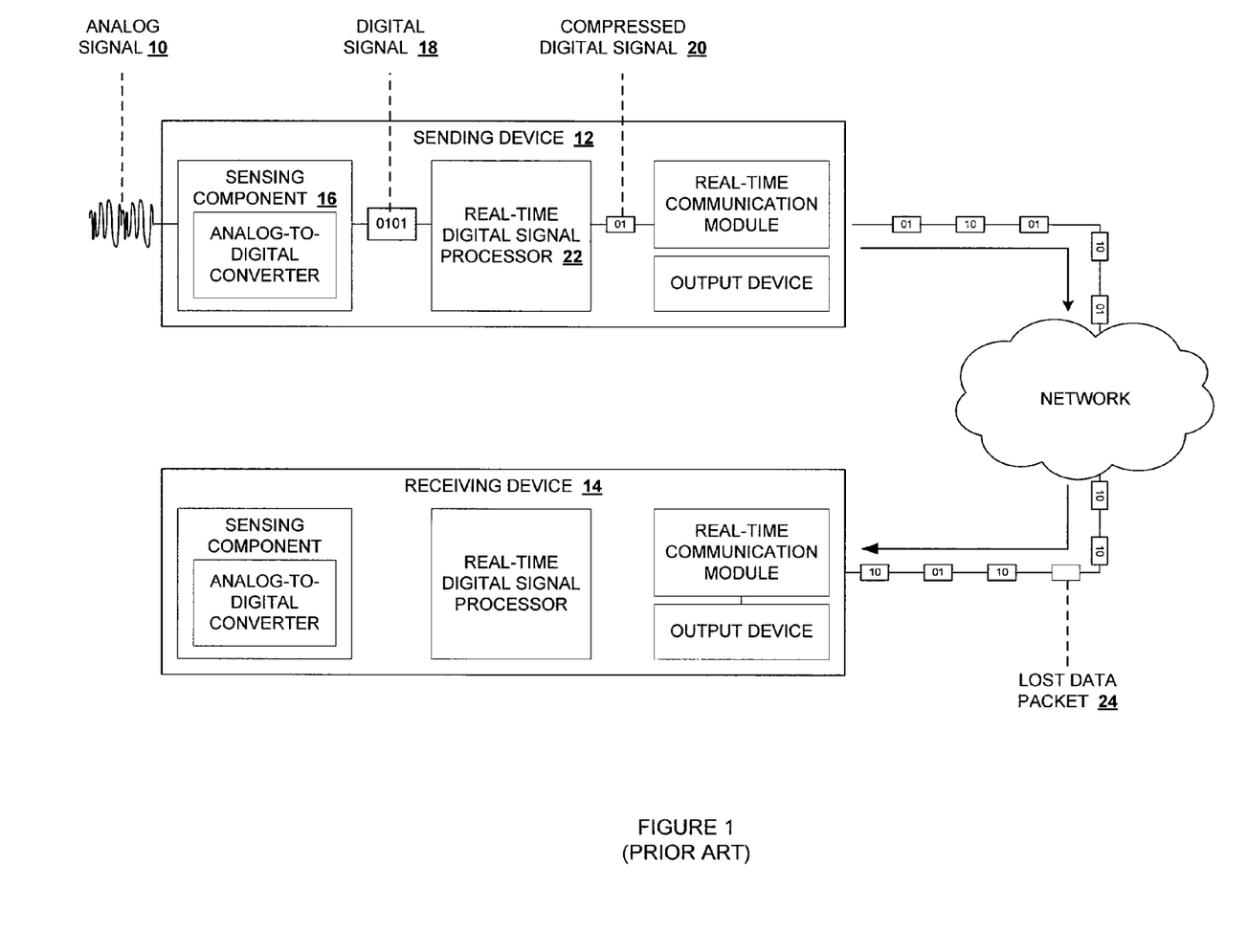
FIG. 1 depicts a block diagram of a conventional real-time communication system, according to an embodiment of the invention.

As illustrated in FIG. 1, in a real-time communication system, a digital representation of a real-world, analog input signal 10 is communicated from a sending device 12 to a receiving device 14. For example, the sending device 12 may be a digital telephone device (e.g., a Voice over Internet Protocol (VoIP) phone), or a video conferencing device. Generally, the sending device 12 has a sensing component (e.g., microphone and/or camera) that captures an analog input signal 10, and converts the analog signal 10 into a digital signal 18.

In order to meet the timing constraints of a real-time system, the digital representation of the input (e.g., digital signal 18) is typically transformed by a digital signal processor 22 into a digital format (e.g., compressed digital signal 20) that is suitable for communication over a real-time communication channel. This transformation may involve compressing the data, for example, with a lossy data-compression algorithm, thereby resulting in signal degradation. In this context, a lossy data-compression algorithm is any data-compression algorithm that does not allow the exact original data to be reconstructed from the compressed data. This can be contrasted to a lossless data-compression algorithm, which is a class of data-compression algorithms that allow the exact original data to be reconstructed from the compressed data. When a lossy data-compression algorithm is used, the digital representation of the input that is received at the receiving device 14 (e.g., compressed digital signal 20) has less information than the digital representation of the input (e.g., digital signal 18) that is initially generated by the sensing component 16 of the sending device 12. Consequently, the perceived quality of the signal (e.g., audio or video) is less, from the perspective of a user of the receiving device 14, than what it might be at the sending device 12.

Another reason that signal quality suffers at a receiving device in a real-time communication system is that data may be lost or altered in transmission, or the data may be received out of order. For example, many real-time communication systems are implemented with communication protocols that do not guarantee data sent from the sending device are actually received at the receiving device, and received in the order sent. Furthermore, some communication protocols do not guarantee that the data sent are not modified in transmission such that the data received are not guaranteed to be identical to the data sent. Such communication protocols are said to be unreliable communication protocols. In contrast, a reliable communication protocol is one that guarantees that the data sent from the sending device 12 will arrive intact at the receiving device 14, and in the same order as sent. Reliable communication protocols typically require more processing overhead and therefore are generally slower than unreliable communication protocols, which do not guarantee data will arrive intact at the receiving device. Therefore, to meet real-time timing constraints, real-time communication systems often use unreliable communication protocols. Consequently, data packets that are lost (e.g., lost data packet 24 in FIG. 1) on route to the receiving device 14 are never delivered to the receiving device 14. These lost packets of data are sometimes referred to as "holes" in the data stream. Although there are techniques for reducing the effects of an occasional lost data packet or hole, generally lost data has a negative overall effect on the listening or viewing experience.

The signal degradation resulting from data compression and lost data packets not only makes the user experience less enjoyable, it also affects the ability to perform further signal processing at the receiving device. For example, the accuracy of a speech recognition processor is dependent upon the quality of the input signal it receives. Consequently, if a real-time signal is processed at the receiving device 14 by a speech recognition processor, the recognition accuracy will likely be less than if the original signal (e.g., digital signal 18) was processed at the sending device 12.

SUMMARY OF THE INVENTION

In one aspect, the invention provides a method for enhancing the archiving capabilities of real-time communication devices. According to an embodiment of the invention, an analog input signal is received at a sensing component of a communication device. The sensing component converts the analog signal into a digital representation of the input signal (e.g., an original signal). The communication device includes digital signal-processing means to process the digital representation of the signal to generate a degraded signal suitable for communication over a real-time communication channel. The degraded signal is transmitted, in real time, to a remote communication device over a real-time communication channel. In addition, the communication device transmits the original signal to the remote communication device over a reliable, or non-real-time, communication channel. Accordingly, the remote communication device receives a degraded signal in real time, and an original uncompressed version of the degraded signal in non-real-time.

Other aspects of the invention are described below and in connection with the description of the figures that follow.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION

Reference will now be made in detail to an implementation consistent with the present invention as illustrated in the accompanying drawings. Wherever possible, the same reference numbers will be used throughout the drawings and the following description to refer to the same or like parts. Although discussed with reference to these illustrations, the present invention is not limited to the implementations illustrated therein. Hence, the reader should regard these illustrations merely as examples of embodiments of the present invention, the full scope of which is measured only in terms of the claims following this description.

Consistent with an embodiment of the present invention, a communication device enables real-time communications by converting an analog input signal into a digital representation of the input that meets the timing constraints of a real-time communications system, for example, a degraded signal. For purposes of this disclosure, a degraded signal is a signal that has been processed to meet real-time timing constraints, and as a result, has reductions to either the objective or perceived signal quality. Examples of such signal-processing algorithms, which may result in a degraded signal, include (but are not limited to) lossy compression, downsampling, conversion from stereo to mono, and noise addition.

In addition, the communication device generates and stores an original and uncompressed digital representation of the analog input signal, in a format that is not subject to the real-time constraints. For purposes of this disclosure, an original signal is a digital signal resulting from an analog to digital conversion. An original signal is therefore an uncompressed signal, the quality of which is subject only to the limitations of the sensing component that captures and converts the analog signal. Accordingly, the communication device communicates the degraded signal, in real time, to another communication device over a real-time communication channel. Furthermore, the communication device communicates original signal data to the other communication device over a reliable communication channel. For example, the original signal may be communicated over an out-of-band channel, or subsequent to the real-time communication session, so as not to interfere with real-time communications. In this context, an out-of-band channel includes any communication channel other than the real-time communication channel.

In one embodiment of the invention, the communication device enables the archiving of data sent and received in a real-time communication session. Accordingly, data that are generated locally at the communication device and represent the original signal are stored in an uncompressed digital format. Real-time data representing the degraded signal, which are received from a remote communication device, for example, over a real-time communication channel, are stored in the format in which they are received—typically in a compressed digital format. Therefore, immediately after a real-time communication session, a user has access to a version of locally generated data (e.g., an original signal), and a version of the data generated at the remote communication device (e.g., a degraded signal).

Advantageously, the communication device provides a mechanism to replace the degraded signal data, received over the real-time communication channel, with original signal data representing the original signal initially generated and stored at the remote communication device. The original signal data representing the digital signal as captured by the sensing component, or an enhanced version of such data, are communicated to the communication device from the remote communication device via a reliable communication channel. For example, this may occur in the background over an out-of-band channel, and/or subsequent to the real-time communication session. The communication device includes a data manager module for managing the replacement of the degraded signal data with the original signal data, and for ensuring that the original signal data from the remote device are synchronized with the original signal data generated locally. This allows a user of the communication device to access an archived version of the original signal data representing the original signal generated during the real-time communication session.

As will be described in greater detail below, in one embodiment of the invention, the original signal data may be enhanced, for example, by processing the original signal data with a speech recognition processor to generate enhanced signal data. For purposes of this disclosure, an enhanced signal is an original signal on which signal processing has been performed to improve either the objective or perceived quality of the signal. An example of a signal-processing algorithm resulting in an enhanced signal includes (but is not limited to) noise reduction and/or echo cancellation. An enhanced signal may also be an original signal that has been processed to include new "features" or qualities to the signal. For example, in the case of an audio signal, an enhanced signal may be a signal processed to add a reverb, or spatialize, harmonize or garbleize the audio. Furthermore, an enhanced signal may be generated by analyzing the original signal to derive biometric data from the original signal, such that the biometric data can be used to supplement the meaning, or provide further insight into information represented by the original signal. In the case of a video signal, an enhanced signal may be a signal to which various visual effects have been added. Other advantages of the invention will become apparent from the description of the figures that follow.

Figure 2:
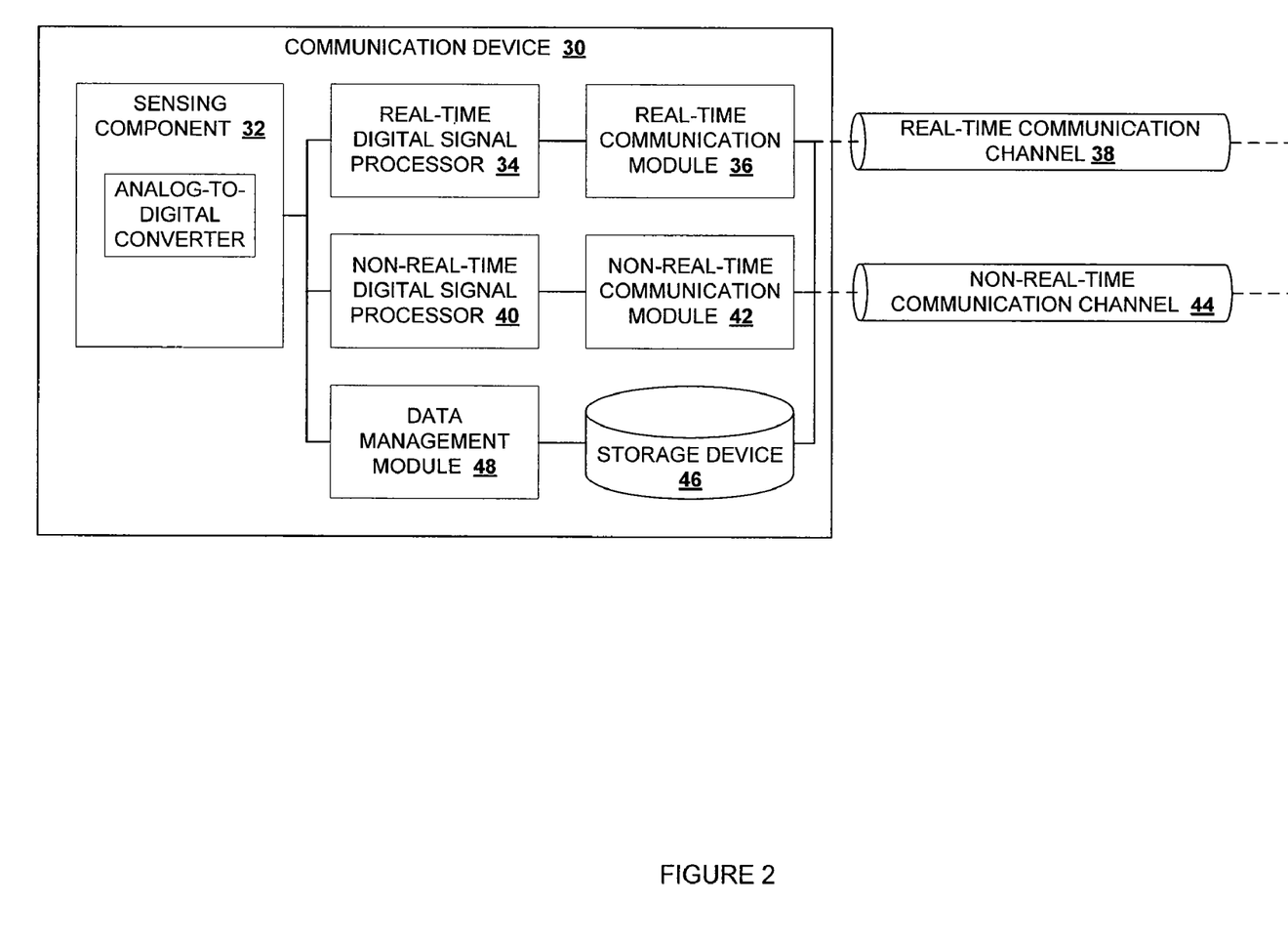
FIG. 2 depicts a simplified block diagram of a communication device, consistent with an embodiment of the invention.

Referring now to FIG. 2, a simplified block diagram of a communication device 30, consistent with an embodiment of the invention, is shown. The communication device 30 includes a sensing component 32 coupled to a real-time digital signal processor 34 and a real-time communication unit 36. The real-time digital signal processor 34 and the real-time communication unit 36 facilitate real-time communications with other communication devices, over real-time communication channels 38. In addition, the sensing component 32 is coupled to a non-real-time digital signal processor 40 and a non-real-time communication module 42, which facilitate non-real-time communications over non-real-time communication channels 44. It will be appreciated by those skilled in the art that the different types of communication channels—real time and non-real-time—may be implemented to use the same physical layer, but with different communication protocols. Alternatively, each type of communication channel may occur on a different physical medium.

The communication device 30 also includes a storage device 46 and a data-management module 48 for storing, and managing data, respectively. The storage device 46, in one embodiment of the invention, may be a hard drive, a flash memory, or any other long-term, non-volatile storage device.

In one embodiment of the invention, the sensing component 32 is an audio signal sensor, such as a microphone, for sensing analog audio signals. In an alternative embodiment, the sensing component 32 may be an image sensor, such as a camera, for sensing still or moving images (e.g., video). In yet another embodiment of the invention, the sensing component 32 may include both image and audio sensors, for capturing both video and audio. In addition to an audio and/or video sensor, in one embodiment, the sensing component 32 may include one or more sensors for sensing biometric data. For example, the sensing component may include one or more biometrics sensing devices (e.g., galvanic skin response sensor, pulse/heart rate sensor, blood glucose level sensor, voice pitch sensor). As illustrated in FIG. 2, the sensing component 32 includes an analog-to-digital converter 33 for converting an analog input signal into a digital format. In an alternative embodiment of the invention, the analog-to-digital converter 33 may be a separate component. In any case, the sensing component 32 senses a real-world analog input signal, and together with the analog-to-digital converter, uses conventional methods or techniques to convert the input signal into a digital format, referred to herein as an original signal. The digital format of the original signal will generally be a high-quality, or uncompressed, representation of the original input signal.

The real-time digital signal processor 34 receives the digital representation of the input generated by the sensing component 32 (e.g., the original signal), and converts or transforms the digital representation into a format that is suitable for real-time communication over a real-time communication channel 38 (e.g., a degraded signal). In one embodiment of the invention, the real-time digital signal processor 34 uses a lossy data-compression algorithm. In an alternative embodiment, a lossless data-compression algorithm may be used. Those skilled in the art will appreciate that a variety of conventional codecs exist, and may be used by the real-time digital signal processor 34, so long as the real-time constraints are met. In any case, a degraded signal suitable for real-time communications results from processing the original signal.

In one embodiment of the invention, the real-time communication module 36 of the communication device 30 includes the necessary networking and communication protocols to establish one-to-one, or one-to-many, real-time communication channels. The real-time communication module 36 may use an unreliable communication protocol for exchanging (e.g., sending and receiving) real-time data with one or more other communication devices. For example, in one embodiment, a real-time communication channel 38 is established utilizing the User Datagram Protocol (UDP) over a conventional Internet Protocol (IP) network, such as the Internet. Alternatively, the real-time communication module 36 may use a reliable communication protocol (e.g., Transfer Control Protocol (TCP)) so long as it is suitable for real-time communications. In an alternative embodiment of the invention, a multicast protocol may be used. It will be appreciated by those skilled in the art that the choice of communication protocols may depend upon the format and type of the data being communicated, and as such, a wide variety of communication protocols may be used without departing from the spirit of the invention.

In addition to enabling real-time communications, the communication device 30 also provides a mechanism for archiving data. In one embodiment of the invention, the digital representation of the input signal that is generated by the sensing component 32 (e.g., the original signal) is stored on the storage device 46 of the communication device 30. Accordingly, the original signal stored on the storage device 46 is generally an uncompressed digital representation of the input and is higher in quality, objectively or as perceived by a user, than the digital representation of the input that is generated by the real-time digital signal processor 34 (e.g., the degraded signal). In addition, the non-real-time digital signal processor 40 may process the original signal before, or after, the data representing the original signal is stored to the storage device 46. In one embodiment of the invention, the non-real-time digital signal processor 40 may enhance the original signal generated by the sensing component. For example, if the sensing component is a microphone, and the original signal represents audio, the non-real-time digital signal processor 40 may perform signal processing to the original signal, such as: compression, noise reduction, echo cancellation, anonymization or garbleization, phonetic recognition, speech recognition, or spatialization, or some other digital signal-processing function.

As degraded signal data are received over the real-time communication channel 38 from one or more other communication devices, the data-management module 48 stores the incoming degraded signal data in the storage device 46. In one embodiment of the invention, the data-management module 48 synchronizes the incoming degraded signal data with the locally generated original signal data, such that the data can be reconstituted in the order in which it was originally generated. For example, if the data are audio data representing a conversation that occurred between two people over a digital telephone system, the recorded audio can be recalled just as the conversation actually occurred.

In one embodiment of the invention, the data-management module 48 also manages the exchange of data representing the original signal over non-real-time communication channels established between communication devices. For example, in one embodiment of the invention, after a real-time communication session has ended, the storage device 22 of the communication device will include an original signal, representing locally generated data, and a degraded signal, representing remotely generated data. The data-management module 48 may automatically negotiate with the remote communication device to receive a replacement for the remotely generated degraded signal data, received over the real-time communication channel. In particular, the data-management module 48 may request a copy of the remotely generated original signal, stored on the remote device, to replace the degraded signal data that were received in real time over the real-time communication channel 38. Accordingly, the devices involved in the real-time communication session may exchange locally generated original signal data over a non-real-time communication channel 44, for example, utilizing the non-real-time communication module 42.

As the communication device 30 receives the remotely generated original signal data, the data-management module 48 manages the replacement operation to replace the degraded signal data with the original signal data. In particular, the data-management module 48 stores the remotely generated original signal data such that the remotely generated original signal data are synchronized with the locally generated original signal data, and ensures that "holes" due to lost data are properly filled with remotely-generated original signal data, and time-skew is not introduced.

Once the original signal data have been exchanged, each user will have a high-quality (e.g., uncompressed) digital representation of the input signals that were initially captured at each user's respective local communication device. If, for example, the original signal data has been enhanced locally by the non-real-time digital signal processor 40, then each user will have a copy of enhanced signal data. For example, if the original signal data represents audio, and a textual representation of the data has been generated by the non-real-time digital signal processor 40, then each user will have a copy of the textual data associated with the original signal data. One advantage of the present invention is that it facilitates processing the original signal data locally before the original signal has been degraded by compressing it, and/or data packets are lost in transmission. Local processing of the original signal data is particularly advantageous when such processing uses a processing method that is customized, or tuned, to a user of the local device. For example, in one embodiment of the invention, the original signal data may be processed locally with a speech recognition process that uses a voice profile customized, or tuned, to a user of the device. The resulting text may then be communicated to a remote device. The enhanced data (e.g., the text resulting from the speech recognition process) is likely to be more accurate when processed locally, than it would be if the original signal is processed at the remote device.

Figure 3:
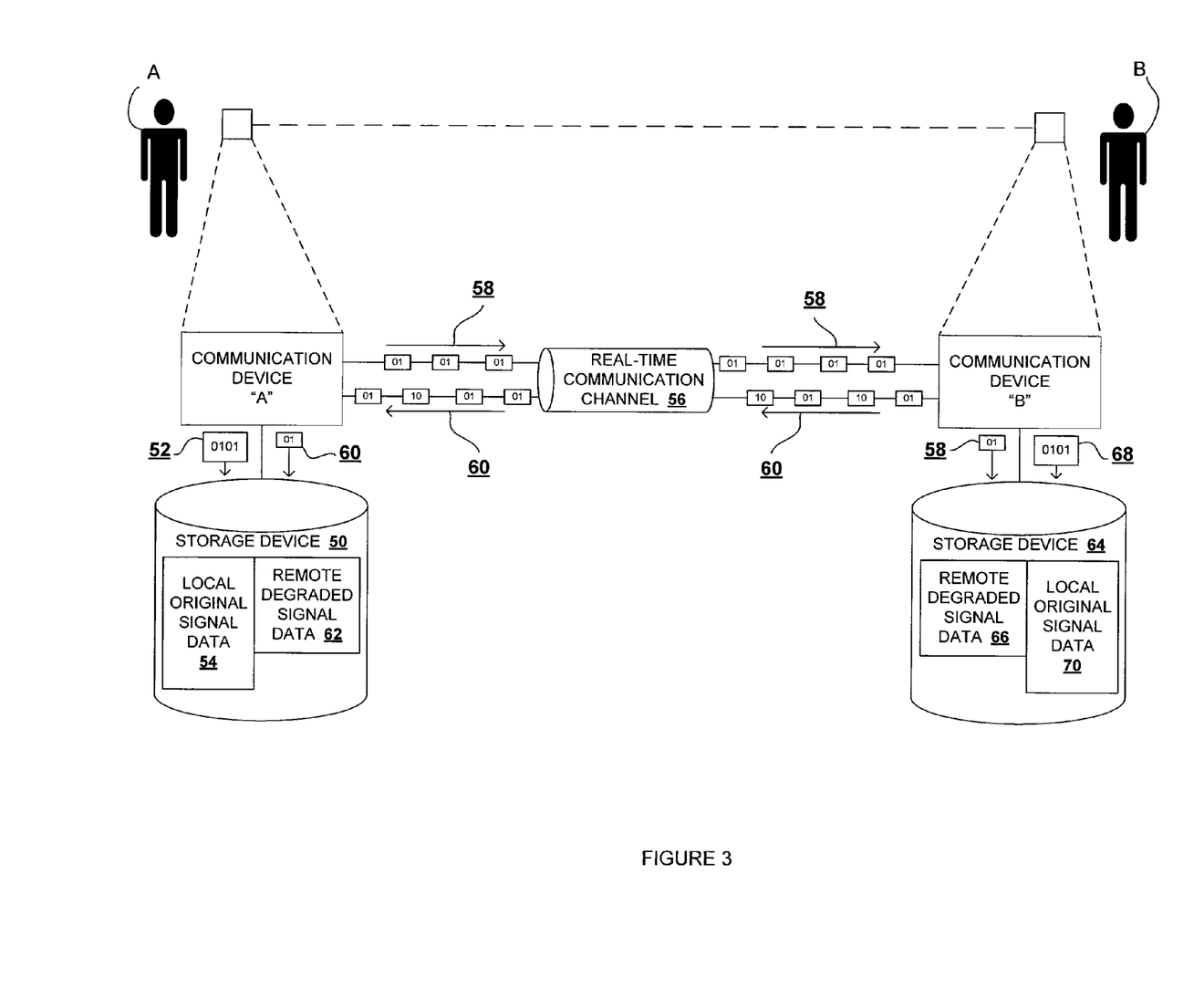
FIG. 3 depicts a block diagram illustrating a real-time exchange of data between communication devices, according to an embodiment of the invention.

FIG. 3 is a block diagram illustrating a real-time exchange of data between communication devices, according to an embodiment of the invention. As illustrated in FIG. 3, two persons (e.g., person "A" and person "B") have established a real-time communication session utilizing communication devices "A" and "B". The communication devices, for example, may be wireless, Voice over Internet Protocol (VoIP) mobile phones. As person "A" speaks into communication device "A", the sensing component of the device converts the analog voice signal into a digital representation. The digital representation of the voice signal, which is referred to herein as an original signal, is stored to the storage device 50 of communication device "A." This is indicated in FIG. 3 by the stream of data (e.g., data 52) being written to the storage device 50 as the file 54 containing local original signal data.

Similarly, as person "B" speaks into communication device "B", the sensing component of the device converts the analog voice signal into a digital representation. The digital representation of the voice signal (e.g., the original signal) is stored to the storage device 64 of communication device "B." This is indicated in FIG. 3 by the stream of data (e.g., data 68) being written to the storage device 64 as the file 70 containing local original signal data.

In addition, communication device "A" includes a real-time digital signal processor, which converts (e.g., compresses) the digital representation of the voice signal generated by the sensing component of device "A" into a digital format that is suitable for communication over a real-time communication channel 56. The communication of this real-time data (e.g., degraded signal data) is indicated in FIG. 3 by the stream of data 58 flowing from communication device "A" to communication device "B" over the real-time communication channel 56. Similarly, communication device "B" is converting data for transmission (e.g., data stream 60), over the real-time communication channel, to device "A."

As communication device "A" receives the degraded signal data 60 over the real-time communication channel 56 from communication device "B", the degraded signal data 60 are stored in the storage device 50. For example, in FIG. 3, this is indicated by the stream of data 60 that is being written to the storage device 50 as the file 62 containing remote degraded signal data. Similarly, as degraded real-time signal data 58 are received at communication device "B", the data 58 are written to the storage device 64 of communication device "B" as the file 66 containing remote degraded signal data. Each communication device (e.g., device "A" and "B") includes a data-management module that handles data synchronization. Consequently, when the real-time communication session ends, each communication device has on its respective storage device local original signal data, representing the voice signal generated at the local device, and remote degraded signal data, representing the voice signal generated at the remote device. The remotely generated data are considered to be lower in quality compared to the original signal data, in part because, in this example, they are compressed, and in part because some data packets may have been lost in transmission.

Figure 4:
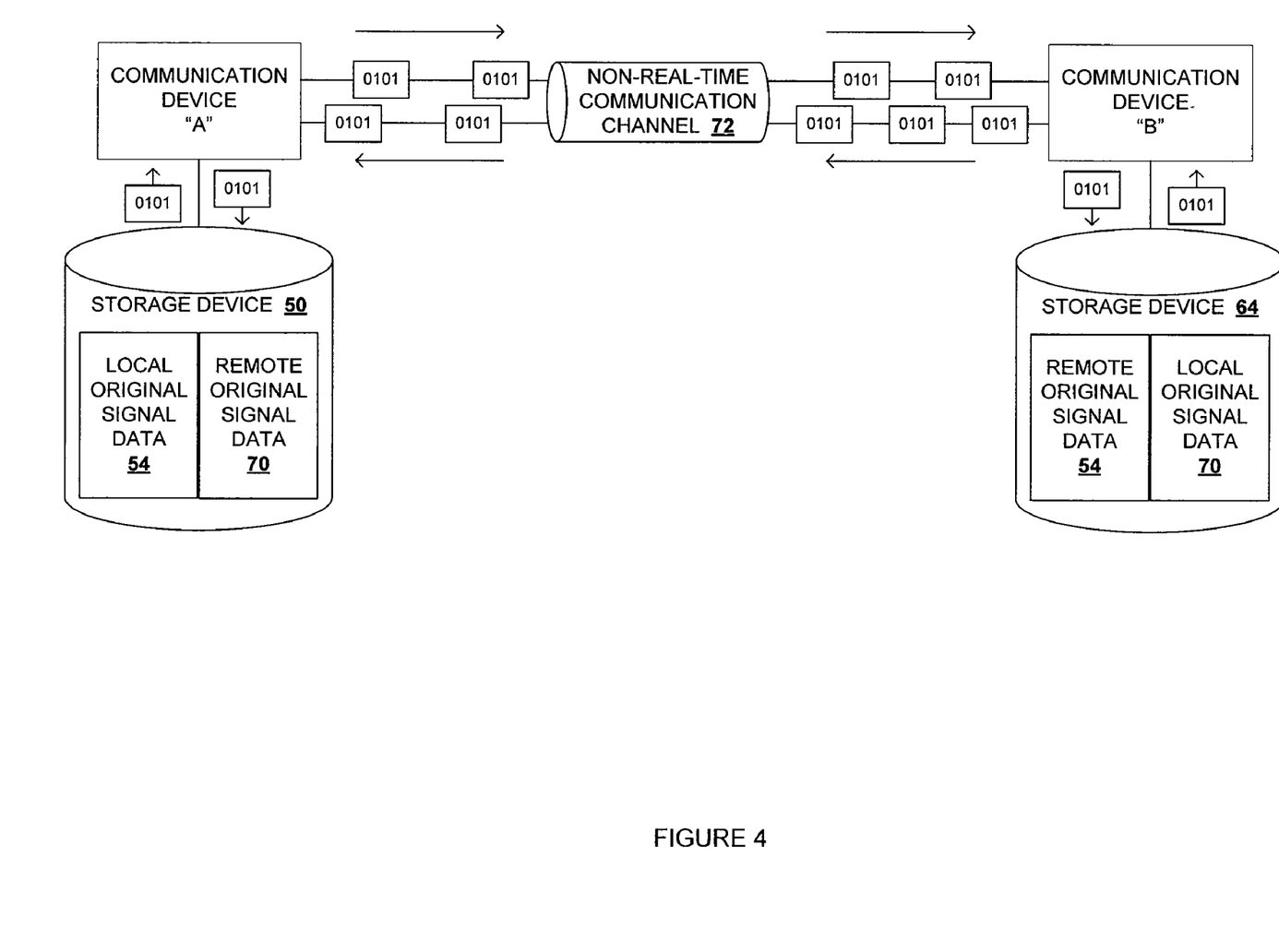
FIG. 4 depicts a block diagram illustrating a non-real-time exchange of data between communication devices, according to an embodiment of the invention.

In one embodiment of the invention, each communication device (e.g., device "A" and "B") exchanges a copy of the locally generated, original signal data (e.g., files 54 and 70) with one another over a non-real-time communication channel 72 to replace the degraded signal data (e.g., files 62 and 66). Accordingly, FIG. 4 is a block diagram illustrating a non-real-time exchange of data between communication devices, according to an embodiment of the invention. Each communication device (e.g., device "A" and "B") involved in the real-time communication session automatically exchanges a copy of the uncompressed, original signal data after the real-time communication session has ended. Alternatively, the uncompressed original signal data may be exchanged during the real-time communication session, but in an out-of-band or low-latency channel, so as not to interfere with the real-time communication session. As illustrated in FIG. 4, communication device "A" is transmitting a copy of the file 54 containing locally generated original signal data to communication device "B." Similarly, communication device "B" is transmitting a copy of the file 70 containing the original signal data generated at communication device "B" to communication device "A." Consequently, the data-management module of communication device "A" is swapping the file 62 containing degraded signal data, for the file 70 containing original signal data. Similarly, communication device "B" is swapping the file 66 containing degraded signal data, for the file 54 containing degraded signal data.

In one embodiment of the invention, the data-management module of each communication device manages the replacement of the data files. For example, the data-management module may automatically negotiate a communication protocol with the other communication device involved in the real-time communication session. In addition, the data-management module may establish the time when the file transfers are to occur. Furthermore, the data-management module manages any synchronization issues that may arise as a result of lost data packets during the real-time communication sessions. For example, if a "hole" exists in the file of a real-time degraded signal recording due to lost data, the data-management module ensures that the "hole" is filled in with the appropriate data from the original signal recording.

In one embodiment of the invention, the non-real-time communication channel 72 may be automatically established between the two devices. It may be established subsequent to the real-time communication channel, or simultaneous to the real-time communication. For example, in one embodiment, the non-real-time channel may be established over a satellite communication system that has low latency. Alternatively, the non-real-time communication channel 72 may be established over an out-of-band channel. For example, the non-real-time communication channel 72 may be as simple as an automated email generated by the communication device. In an alternative embodiment, the non-real-time communication channel may be as rudimentary as participants exchanging files on a storage medium, such as a disk, a memory card, or other digital media storage device.

In one embodiment of the invention, each communication device may support multi-user, real-time communication sessions. Accordingly, the real-time communication module of each device may establish the proper real-time communication channels to connect each device, and user. Furthermore, the data-management module of each device may manage the exchange of non-real-time data with multiple other devices over non-real-time communication channels.

One advantage of the present invention is that it enables a user of a communication device to immediately access degraded signal data from a real-time communication session, while automatically arranging for the degraded signal data to be replaced with original signal data. In addition original signal data that are captured locally can be processed locally, prior to sending the data to a remote device over a non-real-time communication channel.

Referring again to FIG. 2, in one embodiment of the invention, the non-real-time digital signal processor 40 may process the data that are generated by the sensing component 32 to enhance or improve the data, resulting in enhanced signal data. For instance, if the sensing device is a microphone and the original signal data represent digital audio, the non-real-time digital signal processor 40 may process the digital audio to improve its objective or perceived quality. In one embodiment, the non-real-time digital signal processor 40 may analyze or process the digital signal generated by the sensing component 32, and generate yet another representation of the data (e.g., an enhanced signal). For example, the non-real-time digital signal processor 40 may include a speech recognition processor, or engine. The speech recognition processor may analyze the digital signal generated by the sensing component 32 to convert spoken words, and thereby generate textual data associated with the audio. This textual data may be used to facilitate searching of the audio data. For example, the audio data captured by the communication device 30 may be searched by entering a keyword or phrase.

In one embodiment of the invention, the digital representation of the input that is initially generated by the sensing component 32 (e.g., the original signal), and the additional representation of the input data generated by the non-real-time digital signal processor 40 (e.g., the enhanced signal), are communicated over the non-reliable communication channel 44 to a remote communication device, to replace the degraded signal data communicated over the real-time communication channel 38. This enables a user of the remote device, for example, to perform text-based searches of archived audio data. Advantageously, the archived audio data (and corresponding text) are originally generated at the local communication device 30. One advantage of the invention is that data may be processed locally with user-customized algorithms, prior to being sent to a remote device over the non-real-time communication channel 44. For example, if the user of the communication device 30 has a customized speech recognition profile, such profile can be used locally to process the data. Consequently, the user of the remote device will have access to better quality data than would be possible if the degraded real-time signal data (communicated over the real-time communication channel) was processed at the remote device.

In one embodiment of the invention, the searching application may reside on and be executed by the communication device 30, or alternatively, on a conventional computing device that has access to the data from the communication device 30. If, for example, the communication device 30 is a mobile device, the data captured by the device may be easily transmitted to a host computing device, where the data can be accessed, manipulated, and/or searched.

Figure 5:
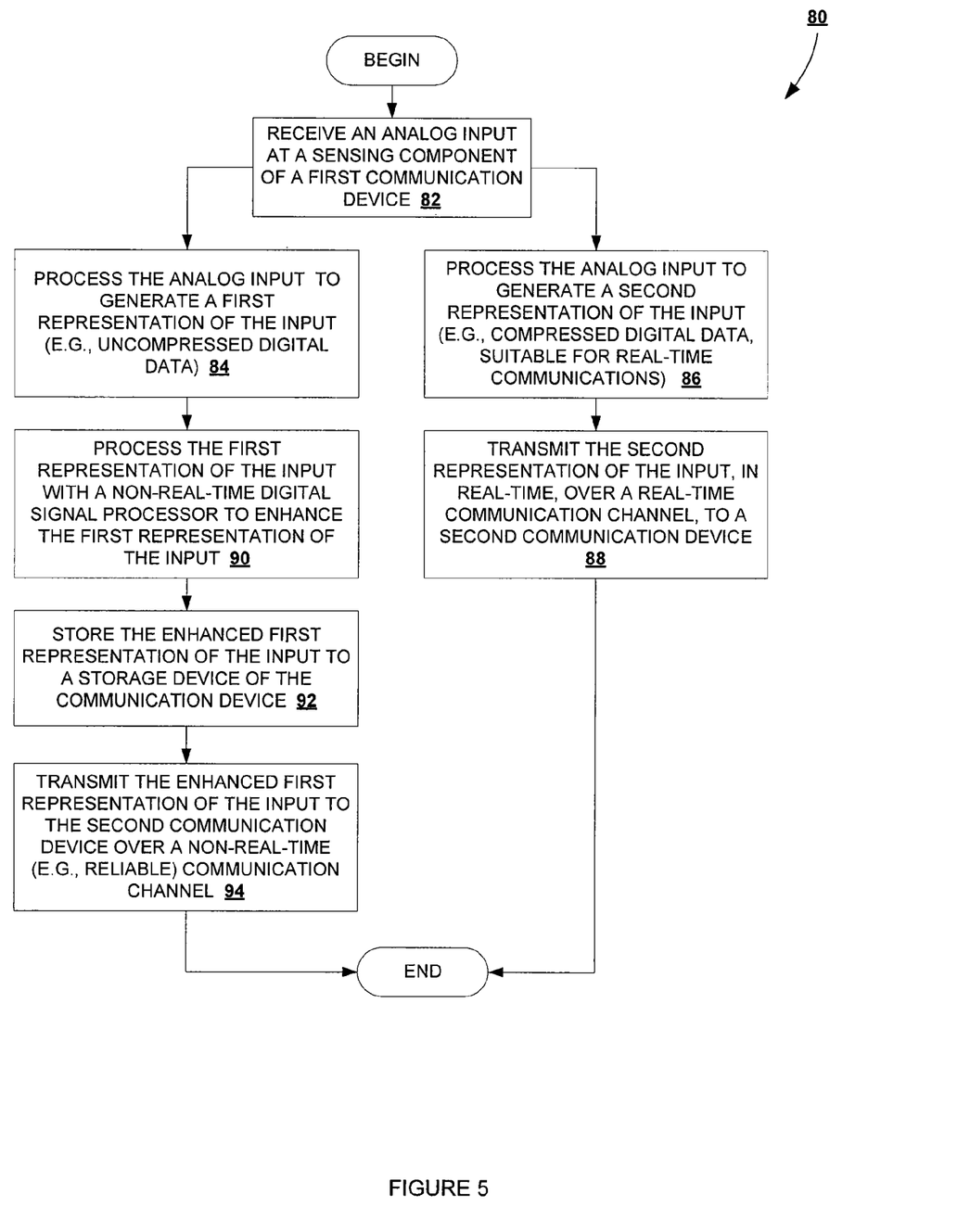
FIG. 5 is a flow diagram showing the operations involved in a method, according to an embodiment of the invention, for processing data in a real-time communication session.

FIG. 5 is a flow diagram showing the operations involved in a method 80, according to an embodiment of the invention, for processing data in a real-time communication session. At operation 82, a communication device receives an analog input signal. For example, the communication device may be a digital telephone device, in which case the analog input signal may be a voice signal. Alternatively, the communication device may be a video conferencing application executing on a conventional, or proprietary, computing system; in which case the sensing component may include both an image sensor (e.g., camera) and audio sensor (e.g., microphone).

At operation 84, the analog input signal is processed to generate a first digital representation of the input signal (e.g., an original signal). For example, in one embodiment of the invention, an analog-to-digital converter that is part of, or coupled to, the sensing component, uses conventional methods for converting the analog input signal to an uncompressed digital format.

At operation 86, the input signal is processed to generate a second digital representation of the input. For example, in one embodiment of the invention, the first digital representation of the input (e.g., the original signal) is transformed by a real-time digital signal processor to generate a second representation of the input (e.g., real-time degraded signal data) that is suitable for communication over a real-time communication channel. Typically, the second representation of the input will be a compressed version of the input data, or a degraded signal. In one embodiment, for example, the real-time digital signal processor uses a lossy compression algorithm to compress the input signal and to generate the second representation of the input.

At operation 86, the second representation of the input (e.g., the degraded signal) is communicated over a real-time channel to a remote communication device. In one embodiment of the invention, the communication device includes a real-time communication module for establishing a real-time communication channel with one or more other communication devices, and for sending and receiving real-time data.

At operation 90, the first representation of the input (e.g., the uncompressed digital data, or original signal) is processed with a non-real-time digital signal processor to generate an enhanced signal. In one embodiment of the invention, the non-real-time digital signal processing occurs at the same time the real-time communication session is occurring. Alternatively, the non-real-time processing may occur subsequent to the real-time communication session indicated by operations 86 and 88. In one embodiment the non-real-time signal processing enhances the quality of the first representation of the input signal (e.g., the original signal).

At operation 92, the enhanced signal data is written to a storage device of the communication device. Accordingly, at operation 94 which occurs in one embodiment at some time subsequent to the real-time communication session, the communication device transmits the enhanced signal data to the remote communication device, so as to enable the remote communication device to replace the degraded signal data (transmitted in real time in operation 86) with the enhanced signal data.

Figure 6:
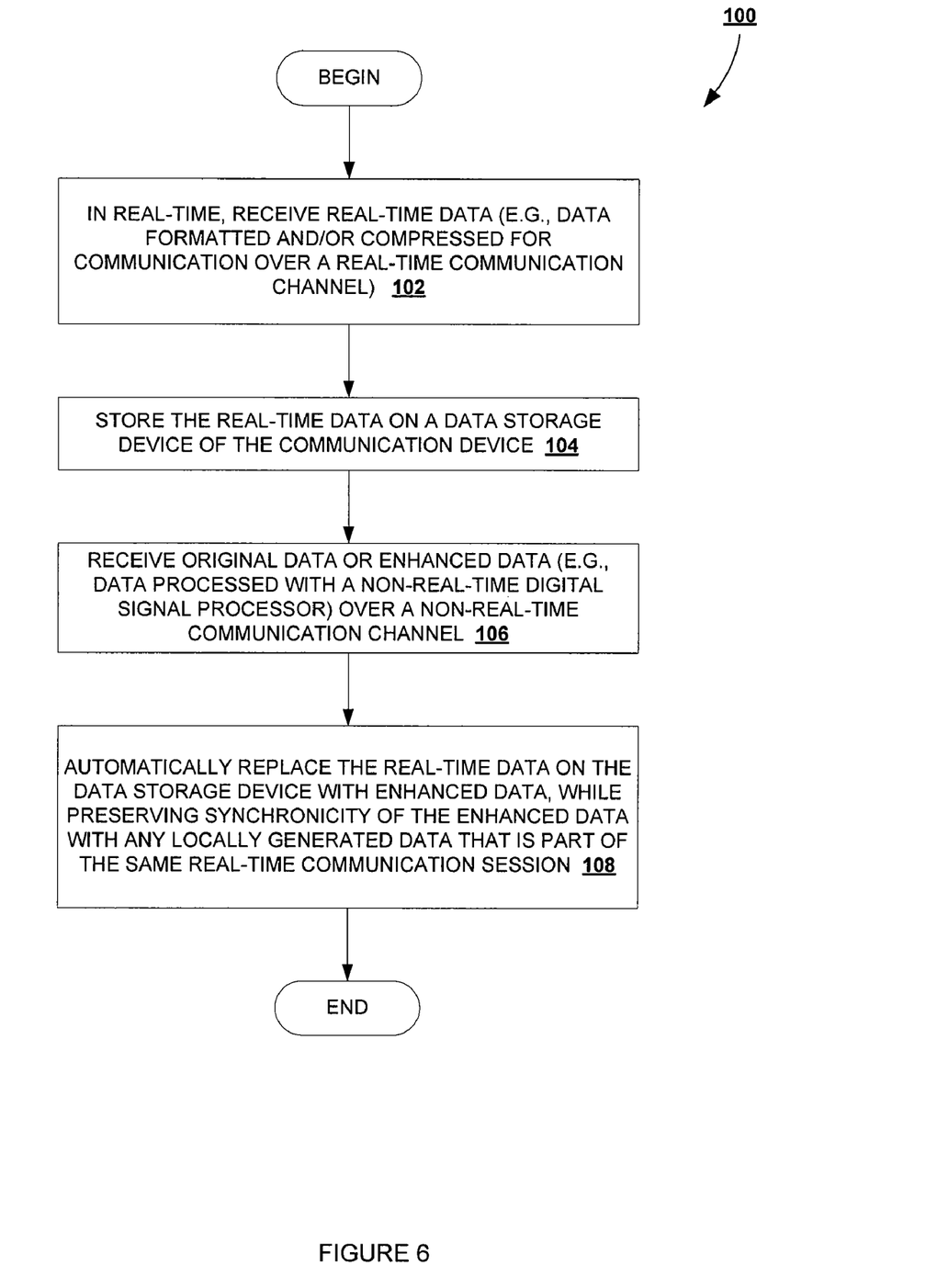
FIG. 6 is a flow diagram showing the operations involved in a method, according to an embodiment of the invention, for processing in-coming data in a real-time communication session.

FIG. 6 is a flow diagram showing the operations involved in a method 100, according to an embodiment of the invention, for processing incoming data in a real-time communication session. At operation 102, real-time data are received, in real time, over a real-time communication channel. In this context, real-time data are degraded signal data that have been formatted or compressed for communicating over a real-time communication channel.

At operation 104, the degraded signal data are stored to a storage device of the communication device. For example, in one embodiment of the invention, the communication device includes a data-management module that manages storage operations to ensure that data received from a remote device are synchronized with locally generated data when the two sources of data are part of the same real-time communication session.

At operation 106, the communication device receives original signal data or enhanced signal data from the remote communication device over a reliable, or non-real-time communication channel. For example, the communication device may receive original signal data, as captured by the sensing component of the remote communication device. Alternatively, the remote communication device may enhance the original signal data, for example, by processing the original signal data with a non-real-time digital signal processor of the remote communication device.

At operation 108, the data-management module of the communication device automatically replaces the degraded signal data with the enhanced signal data. The replacement operation is performed in a manner that ensures that synchronicity between locally generated data and remotely generated data are preserved for a particular real-time communication session.

It will be appreciated by those with skill in the relevant art, that the various components, devices, modules and processors of the communication device 30 illustrated in the figures may be implemented in hardware, software, firmware, or any combination thereof. For instance, real-time digital signal processor 34 and non-real-time digital signal processor 40 may be software-implemented algorithms; or alternatively, each may be a separate hardware component. In addition, a communication device consistent with an embodiment of the invention may very well include various additional components, devices, modules and processors that have not been shown or described herein, in part, to avoid obscuring the invention.

The foregoing description of an implementation of the invention has been presented for purposes of illustration and description. It is not exhaustive and does not limit the invention to the precise form disclosed. A communication device consistent with an embodiment of the invention may take one of several form factors to include a mobile phone, a desktop phone, a mobile computer device (e.g., such as a personal digital assistant, or laptop computer), or a desktop computing device, among others. Furthermore, although the present invention has been described herein primarily in the context of a real-time telephone or video conferencing communication system, it will be appreciated by those skilled in the art that the present invention may find practical application in a variety of alternative contexts that involve real-time communications.

Finally, the illustrative processing steps performed by a program may be executed in a different order than described above, and additional processing steps may be incorporated. The scope of the invention is defined by the claims and their equivalents.

What is claimed is:

1. A method comprising:
    processing input received at a sensing component of a first communication device to generate a first representation of the input and a second representation of the input, wherein the first representation of the input is generated by converting an analog signal to a digital signal and the second representation of the input is suitable for communication over a real-time communication channel;
    transmitting, in real time, the second representation of the input to a second communication device over the real-time communication channel, and transmitting the first representation of the input to the second communication device over a reliable communication channel; and
    processing the first representation of the input to generate a third representation of the input and transmitting the third representation of the input to the second communication device over the reliable communication channel along with the first representation of the input,
    wherein the third representation of the input is generated by processing the first representation of the input with a speech recognition algorithm.

2. The method of claim 1, wherein transmitting the first representation of the input to the second communication device over the reliable communication channel occurs subsequent to transmitting, in real time, the second representation of the input to the second communication device.

3. The method of claim 1, wherein transmitting the first representation of the input to the second communication device over the reliable communication channel and transmitting, in real time, the second representation of the input to the second communication device occur substantially simultaneously.

4. The method of claim 1, wherein the second representation of the input is generated by compressing the digital signal in accordance with a lossy compression algorithm.

5. The method of claim 1, wherein the speech recognition algorithm is customized to a user of the first communication device.

6. The method of claim 1, wherein the third representation of the input is generated by processing the first representation of the input to derive biometric information from the first representation of the input.

7. The method of claim 1, wherein the reliable communication channel is an out-of-band communication channel.

8. A method comprising:
    receiving, in real time, degraded signal data from a remote communication device, said degraded signal data suitable for communication over a real-time communication channel;
    storing the degraded signal data on a storage device;
    receiving original signal data over a reliable communication channel, and receiving, along with the original signal data, a textual representation of the original signal data over the non-real-time communication channel; and
    automatically replacing the degraded signal data with the original signal data on the storage device,
    wherein the textual representation of the original signal data is generated at the remote communication device with a speech recognition engine.

9. The method of claim 8, wherein the original signal data are data generated at the remote communication device by converting analog signal data to digital signal data.

10. The method of claim 8, wherein the original signal data are enhanced at the remote communication device by signal processing the original signal data.

11. The method of claim 8, wherein the degraded signal data are data generated at the remote communication device by compressing original signal data in accordance with a lossy compression algorithm.

12. The method of claim 8, wherein the degraded signal data are data generated at the remote communication device by compressing original signal data in accordance with a lossless compression algorithm.

13. The method of claim 8, wherein storing the degraded signal data on a storage device includes synchronizing the degraded signal data with locally generated original signal data stored on the storage device.

14. The method of claim 8, wherein automatically replacing the degraded signal data with the original signal data on the storage device further comprises:
communicating a request to the remote communication device, the request prompting the remote communication device to send the original signal data over a non-real-time communication channel; and
synchronizing the original signal data with locally generated original signal data stored on the storage device.

15. The method of claim 14, wherein synchronizing the original signal data with locally generated signal data stored on the storage device includes filling holes in degraded signal data with original signal data, while maintaining the synchronicity of the original signal data with locally generated original signal data.

16. A method comprising:
receiving, in real lime, degraded signal data from a remote communication device, said degraded signal data suitable for communication over a real-time communication channel;
storing the degraded signal data on a storage device;
receiving original signal data and a textual representation of the original signal data over a reliable communication channel; and
automatically replacing the degraded signal data with the original signal data on the storage device, wherein the textual representation of the original signal data is generated at the remote communication device with a speech recognition engine customized to a user of the remote communication device.

17. A method comprising:
receiving, in real time, degraded signal data from a remote communication device, said degraded signal data suitable for communication over a real-time communication channel;
storing the degraded signal data on a storage device;
receiving original signal data over a reliable communication channel and receiving, along with the original signal data, biometric data derived from the original signal data, wherein the biometric data is derived by signal processing the original signal data at the remote communication device; and
automatically replacing the degraded signal data with the original data on the storage device.

18. A communication device, comprising:
a sensing component to convert an analog input signal into original signal data, said original signal data a digital representation of the analog input signal;
digital signal processing means to convert the original signal data into degraded signal data, suitable for communication over a real-time communication channel;
a storage device to store the original signal;
a communication module to send and receive a degraded signal over a real-time communication channel and to send and receive an original signal over a reliable communication channel; and
a data-management module to direct the communication device to replace degraded signal data received from a remote communication device over a real-time communication channel and stored on the storage device with original signal data received from a remote communication device over a reliable communication channel,
wherein said digital signal processing means is to process the original signal data to generate a textual representation of audio data with speech recognition algorithms; and, the data-management module is to direct the communication device to transmit the textual representation of the audio data along with the original signal data to the remote communication device over a reliable communication channel, so as to enable the remote communication device to replace degraded signal data, previously received from the communication device, with the original signal data and the textual representation of the audio data.

19. The communication device of claim 18, wherein said digital signal processing means is to process the original signal data to generate a textual representation of audio data with speech recognition algorithms customized to a user of the communication device.

20. The communication device of claim 18, wherein the data-management module is to automatically synchronize the original signal data received from a remote communication device with locally generated original signal data when the original signal data and locally generated original signal data are from the same real-time communication session.

21. The communication device of claim 18, wherein said digital signal-processing means is to process said original signal data to generate enhanced signal data; and said communication module is to send and receive the enhanced signal data over the reliable communication channel.

* * * * *